Figure 1:
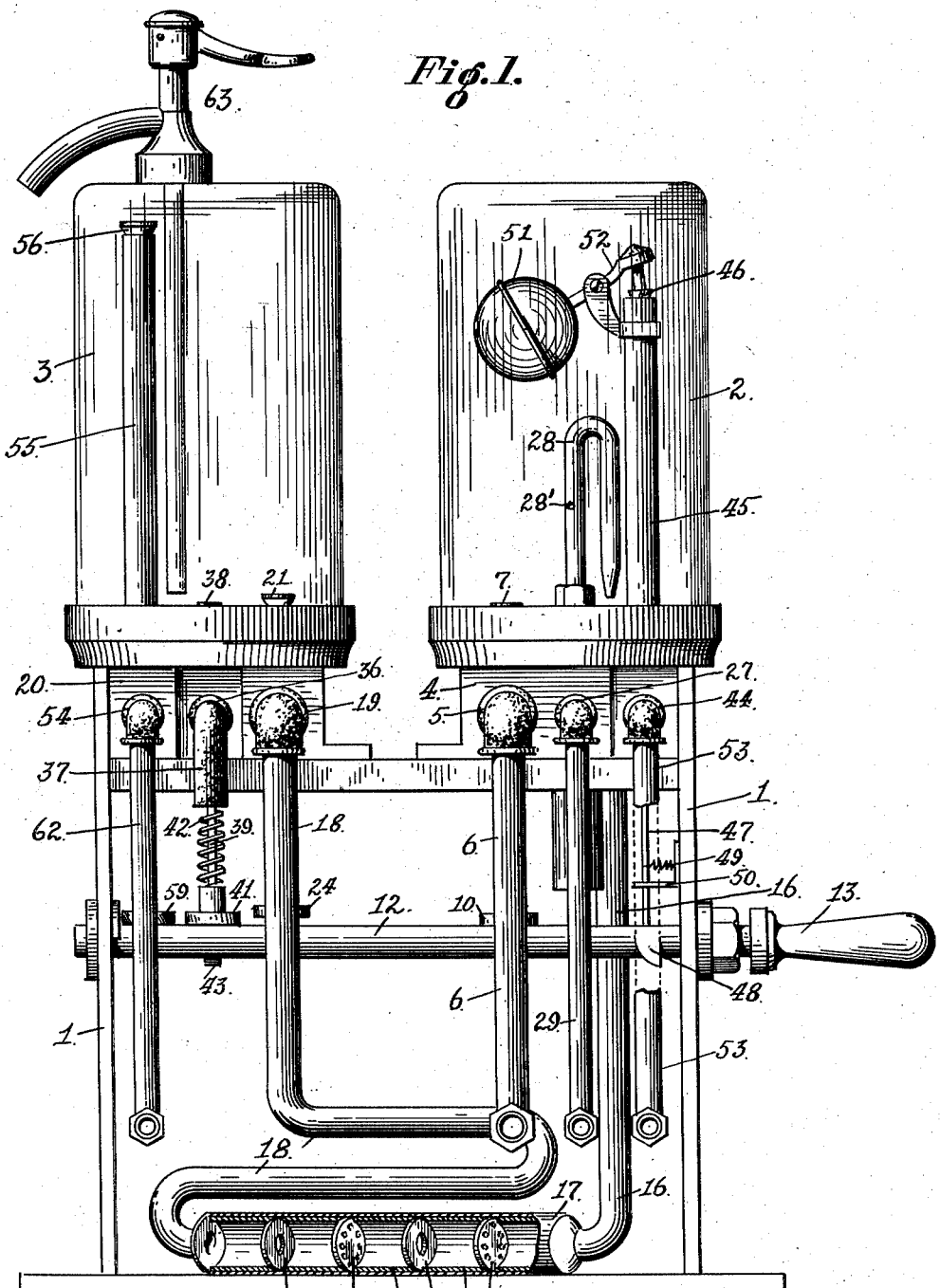

J. B. YOUNG.
APPARATUS FOR AERATING LIQUIDS.
APPLICATION FILED JAN. 10, 1910.

967,286.

Patented Aug. 16, 1910.
2 SHEETS—SHEET 1.

WITNESSES.
Arthur L. Slee.
S. Constine.

INVENTOR.
Jackson B. Young
by Wm F. Booth
his Attorney.

J. B. YOUNG.
APPARATUS FOR AERATING LIQUIDS.
APPLICATION FILED JAN. 10, 1910.
967,286.
Patented Aug. 16, 1910.
2 SHEETS—SHEET 2.
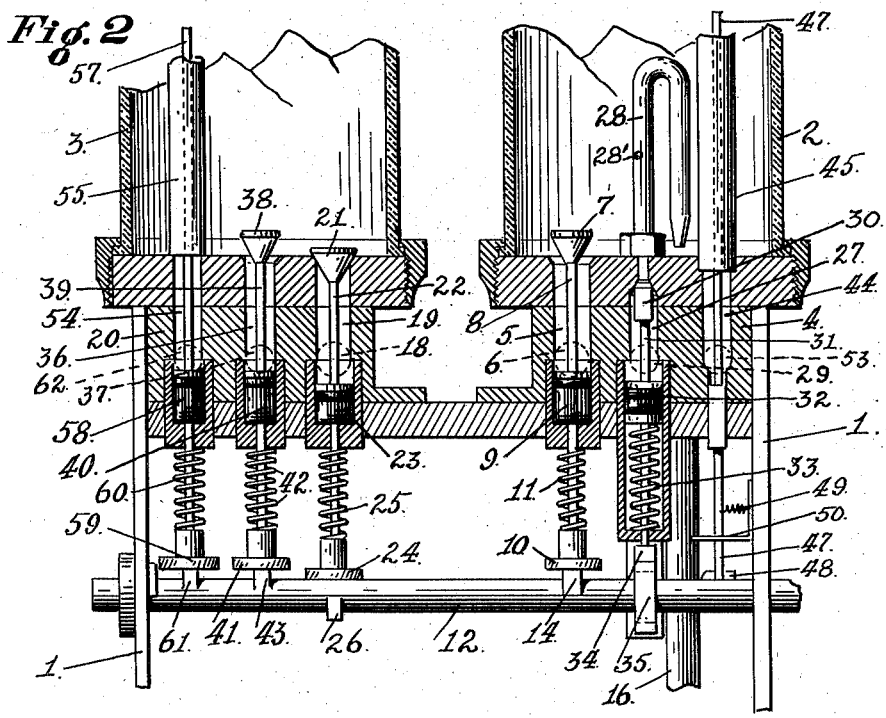
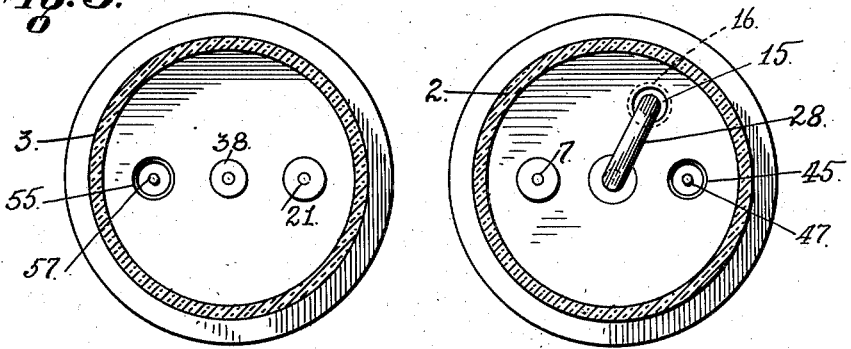
WITNESSES.
Arthur L. Slee
S. Constine
INVENTOR.
Jackson B. Young
by Wm. F. Booth
his Attorney.

UNITED STATES PATENT OFFICE.

JACKSON B. YOUNG, OF OAKLAND, CALIFORNIA.

APPARATUS FOR AERATING LIQUIDS.

967,286.   Specification of Letters Patent.   Patented Aug. 16, 1910.

Application filed January 10, 1910. Serial No. 537,236.

*To all whom it may concern:*

Be it known that I, JACKSON B. YOUNG, a citizen of the United States, residing at Oakland, in the county of Alameda and State of California, have invented certain new and useful Improvements in Apparatus for Aerating Liquids, of which the following is a specification.

My invention relates to the class of apparatus for aerating liquids, more commonly employed for carbonating water.

The chief object of my invention is to provide an apparatus of this type which will be operative for desirable results, regardless of the water pressure, and in which the impregnation is effected by the pressure of the gas alone, which pressure may be regulated to suit individual taste in the commodity furnished.

Many other objects of my invention will, hereinafter, be noted.

My invention consists in the novel construction and arrangement of the apparatus which I shall now fully describe, by reference to the accompanying drawings, in which—

Figure 1 is an elevation of my apparatus, partly in section. Fig. 2 is a broken sectional elevation of the same, to show the valves. Fig. 3 is a horizontal section of the two jars.

1 is a stand upon which is supported two receptacles or containers, which, from their functions, I may properly term the charging jar 2 and the dispensing jar 3. These may be made of any suitable shape and material, though I have here shown them as made of glass, which in addition to sanitary value, adds some attractiveness, as well as interest in the visible operations.

The charging jar 2 is suitably secured to a base casting 4, in which is made a port 5 opening through the top of the casting into the jar, as seen in Fig. 2. The other end of said port opens through the side of the casting, and has fitted to it the inlet pipe 6, Fig. 1, which is supposed to lead from any source of water.

The port 5 is controlled at its upper end by an upwardly moving valve 7, the stem 8 of which passes down through a suitable fluid-tight packing 9, and carries a foot 10, and a spring 11, the latter holding the valve normally closed.

12 is a shaft, rotatably by a handle 13. This shaft carries a number of cams, one of which, 14, operates under the stem-foot 10, to lift and open the valve 7, as is indicated in Fig. 2.

Opening downwardly from jar 2 through its base is a passage 15, seen in Fig. 3. To the lower end of this passage the pipe 16 is connected, said pipe, as shown in Fig. 1, leading to a mixer 17, from which a pipe-coil 18, of any suitable length and course, leads to the outer end of a port 19, which enters through the side of the base-casting 20 of the dispensing jar 3, and thence leads through said casting, as shown in Fig. 2, and opens into the jar 3. The upper end of this port 19 is controlled by an upwardly moving valve 21, the stem 22 of which passes down through a suitable fluid-tight packing at 23, and carries a foot 24 and spring 25. A cam 26 on the shaft 12 operates under the foot 24, to lift the valve 21.

In the base casting 4 of jar 2 is made a port 27 which at its upper end is fitted with an injector nozzle 28, the tip of which lies just above and is adapted to discharge its gas downwardly into the outlet passage 15, as seen in Fig. 3. The injector nozzle has a small hole 28' made through its wall, to admit some of the gas directly into the jar 2. The outer end of this port 27 opens through the side of the base casting and has fitted to it, as shown in Fig. 1, a pipe 29 which may be supposed to lead from any source of gas under pressure.

The port 27 is controlled by a valve 30 which moves upward to its seat, as shown in Fig. 2, and said valve has a stem 31 which passes down through suitable fluid-tight packing at 32 and has a controlling spring 33. The lower end of the stem 31 is fitted with a cam-yoke 34, within which operates a cam 35 on the cam-shaft 12.

In the base casting 20 of jar 3 is made a port 36, the upper end of which opens into said jar, as seen in Fig. 2, and the outer end has connected with it a delivery pipe 37 as shown in Fig. 1. The upper end of port 36 is controlled by an upwardly opening valve 38, the stem 39 of which passes down through a suitable fluid-tight packing at 40, and carries a foot 41 and a controlling spring 42. A cam 43 on the cam shaft 12 operates under the foot 41, to open the valve 38.

In the base-casting 4 of jar 2 is made a vent-port 44, the upper end of which is fitted with a vent-tube 45 which, as shown in Fig. 1, extends upward in jar 2, to near its top. The upper end of this vent-tube is controlled by a downwardly seating valve 46 which is upon a stem 47 passing down through the tube and through the port 44. The lower end of this stem is operated upon by a cam 48 on the cam shaft 12. This cam, as shown in Fig. 1, has a curved side, against which the end of the stem impinges, and rests upon the shaft itself as seen in Fig. 2, thereby keeping the valve 46 closed during a portion of the time. A small spring 49 pulls the stem, the end of which is sufficiently flexible, over in a guide 50, in position to be raised by the cam during the other portion of the revolution as will be more fully described hereafter.

If water under sufficient initial pressure is introduced to jar 2, no other venting provision need be made, but where the incoming water is under no appreciable pressure, then I insert a float 51 in jar 2, and connect its arm 52 with the valve 46, so that the weight of the float, while the jar is filling will hold valve 46 open, to permit the air to escape, and said float will close the valve when the jar is filled, in the usual manner of such devices. The outer end of the vent port 44 has connected with it a vent pipe 53, Fig. 1, which opens to the outer atmosphere.

In the base-casting 20 of jar 3 is made a port 54, the upper end of which has connected with it a vent tube 55 which rises, as seen in Fig. 1, to near the top of the jar 3. The upper end of this tube is controlled by a valve 56, the stem 57 of which passes down, as seen in Fig. 2, through said tube and through the port 54. It is suitably packed at 58 and carries a foot 59 and a controlling spring 60. A cam 61 on the cam-shaft 12 operates under foot 59 to lift the valve 56. The outer end of port 54 has fitted to it a vent-pipe 62, as seen in Fig. 1, which opens to the outer atmosphere. 63 in Fig. 1, is the ordinary siphon valve discharge, fitted to jar 3. This may or may not be employed, and if present, is used only in case one desires to have the carbonated water delivered under pressure, instead of by gravity only, or it may be used to fill the ordinary seltzer-bottles.

In Fig. 1, the mixer 17, heretofore mentioned may consist of any suitable channel which by breaking up the lines of flow will cause a more perfect impregnation of the liquid with the gas. In the present case, I deem the form here shown a novel and advantageous one. It consists of a tube, or shell traversed at intervals by disks of two constructions. One, designated by 64 is centrally perforated by a relatively large hole; the other, 65 is formed with an annular series of relatively small holes, disposed near its periphery. These two constructions alternate, as shown, and are held in place by intervening sleeves 66. The course of flow is thus an interrupted, tortuous one, which results in an intimate mixture of liquid and gas. A more or less similar result may be had by lengthening and rendering more tortuous the pipe coil 18, in which case the mixer proper may or may not be employed.

The apparatus having now been fully described, the following description of its operation will be understood.

It may be stated, at the outset, that pressure of the water is not to be essentially considered. The water may or may not be under pressure as is ordinarily understood in this art. It need be under head only sufficient to flow into the charging jar 2. The pressure of the gas may be reduced to any degree, according to the taste of the user. If a sharper aeration be required the pressure of gas has only to be increased. Let us suppose, then, that the pipe 6 be connected with any source of water flow, whether from a spring, a tank, a city-main, or other delivery of water; and that the pipe 29 be connected with a flask or tank of compressed gas, reduced by a regulator to any working pressure. Suppose now the cam-shaft 12 be turned so that the valve 7 will be lifted. The water will now flow, under whatever head it may have, into the charging jar 2; and, because, the float 51 is holding the air vent valve 46 open, the jar will fill with the water no matter how low its pressure may be. If, however, the water be under sufficient pressure to compress the air in jar 2 without an air vent while filling, it will be seen that, as I have heretofore stated, the float may be omitted, and the vent valve 46 remain closed while filling. But, continuing the operation, with the presence of the float, the jar 2 will fill, until stopped by the float. We have now, the jar 2, filled with water, and the air vent 45 closed. Now a further movement of the cam shaft 12 will cut off the incoming water, and open the valve 30 to the gas from pipe 29. At the same time, it will open the valve 21 in the dispensing jar 3. Thereupon the gas injected through the nozzle 28 into the passage 15 will, by injective suction, assisted by the gas pressure admitted through its small hole 28' carry the water with it, so that the water will be forced under pressure of the gas out of the jar through the passage 15 through the pipe 16, the mixer 17 and the pipe coil 18, in all of which the water and gas will be mixed and carbonated and up past the open valve 21 into the dispensing jar 3, and fill said jar with the aerated water. The apparatus is now ready for continued use. To draw the aerated water from the dispensing jar 3 the cam shaft is again turned. This has certain simultaneous effects, and both jars are relieved of pressure as follows:—Valve 21 is closed and entraps the aerated water in the dispensing jar 3, and the vent valve 56 in said jar is opened and the compressed air is exhausted through vent 55; at the same time gas valve 30 is closed and vent valve 46 in charging jar 2 is opened by cam 48 and the gas is exhausted through pipe 53 so that said charging jar may be refilled with fresh water. Then when both of said jars shall have been relieved of the air and gas pressure, another slight turn of cam shaft 12 produces two other simultaneous effects, towit:—Valve 38 in dispensing jar 3 is opened and the aerated water, under no pressure other than its own head, is drawn out by gravity and without undue agitation which is of advantage in the quality of the commodity furnished; and, at the same time, valve 7 in charging jar 2, is opened, and said jar, having been relieved of its gas pressure, is refilled with fresh water. By the time the aerated water in jar 3 is delivered, the charge of fresh water in jar 2 is complete, and, thereupon, the further movement of the cam shaft, stops both delivery and discharge, and opens the gas connection to immediately cause the water and gas to proceed again through the mixer and pipe coil and once more fill the dispensing jar.

As before stated, the aerated water may be delivered under pressure through the siphon delivery 63 if desired; but this is not best, as the water is of improved quality if allowed to flow with minimum disturbance, under its own gravity head.

I thus provide a simple and inexpensive machine for aerating water or other liquids from any supply, regardless of water pressure, by means of the pressure of the gas which is used to carbonate the water, and I thus dispense with any other pressure or machinery.

This apparatus will aerate water from springs or other locations without regard to pressure, or where a filter is placed in the water supply pipe, which takes away or diminishes whatever pressure may exist. Provision is also made for relieving pressures without agitating the aerated water, and then drawing it off by its own gravity. By the siphon arrangement a foaming beverage may be had if desired. The arrangement of the valves, here shown, which lift from their seats and return again without rubbing or wearing action, such as occurs with a plug-valve is especially desirable in this class of apparatus.

Having thus described my invention what I claim as new and desire to secure by Letters Patent is:—

1. In an apparatus for aerating liquids, the combination of a charging jar having a valve-controlled inlet communicating with the water source, a valve-controlled inlet communicating with the gas source, and a joint outlet passage for the water and gas; a dispensing jar having a valve-controlled inlet for the mixed water and gas, and a valve-controlled delivery for the same; an injector nozzle in the charging jar communicating with the gas inlet and arranged to inject the gas into the outlet passage of said jar to carry the water with it from said jar; a pipe connection between the outlet passage of the charging jar and the inlet of the dispensing jar; and means for timely operating the valves of said inlets and outlets.

2. In an apparatus for aerating liquids, the combination of a charging jar having a valve-controlled inlet communicating with the water source, a valve-controlled inlet communicating with the gas source, and a joint outlet passage for the water and gas; a dispensing jar having a valve-controlled inlet for the mixed water and gas, and a valve-controlled delivery for the same; an injector nozzle in the charging jar communicating with the gas inlet and arranged to inject the gas into the outlet passage of said jar to carry the water with it from said jar; a pipe connection between the outlet passage of the charging jar and the inlet of the dispensing jar; and means for timely operating the valves of said inlets and outlets consisting of a cam-shaft common to all said valves.

3. In an apparatus for aerating liquids, the combination of a charging jar having a valve-controlled inlet communicating with the water source, a valve-controlled inlet communicating with the gas source, a valve controlled air and gas relief vent and a joint outlet passage for the water and gas; a dispensing jar having a valve-controlled inlet for the mixed water and gas, a valve-controlled delivery for the same, and a valve-controlled air and gas relief vent; an injector nozzle in the charging jar communicating with the gas inlet and arranged to inject the gas into the outlet passage of said jar to carry the water with it from said jar; a pipe connection between the outlet passage of the charging jar and the inlet of the dispensing jar; and means for timely operating the valves of said inlets, outlets and vents.

4. In an apparatus for aerating liquids, the combination of a charging jar having a valve-controlled inlet communicating with the water source, a valve-controlled inlet communicating with the gas source, a valve controlled air and gas relief vent, the valve of said vent having connected with it a float to control it when said charging jar is being filled, and a joint outlet passage for the water and gas; a dispensing jar having a valve-controlled inlet for the mixed water and gas, a valve-controlled delivery for the same, and a valve-controlled air and gas relief vent; an injector nozzle in the charging jar communicating with the gas inlet and arranged to inject the gas into the outlet passage of said jar to carry the water with it from said jar; a pipe connection between the outlet passage of the charging jar and the inlet of the dispensing jar; and means for timely operating the valves of said inlets, outlets and vents.

5. In an apparatus for aerating liquids, the combination of a charging jar having a valve-controlled inlet communicating with the water source, a valve-controlled inlet communicating with the gas source, a valve controlled air and gas relief vent and a joint outlet passage for the water and gas; a dispensing jar having a valve-controlled inlet for the mixed water and gas, a valve-controlled delivery for the same, and a valve-controlled air and gas relief vent; an injector nozzle in the charging jar communicating with the gas inlet and arranged to inject the gas into the outlet passage of said jar to carry the water with it from said jar; a pipe connection between the outlet passage of the charging jar and the inlet of the dispensing jar; and means for timely operating the valves of said inlets, outlets and vents consisting of a cam-shaft common to all said valves.

6. In an apparatus for aerating liquids, the combination of a charging jar having a valve-controlled inlet communicating with the water source, a valve-controlled inlet communicating with the gas source, and a joint outlet passage for the water and gas; a dispensing jar having a valve-controlled inlet for the mixed water and gas, and a valve controlled delivery for the same; an injector nozzle in the charging jar communicating with the gas inlet and arranged to inject the gas into the outlet passage of said jar to carry the water with it from said jar; a pipe connection between the outlet passage of the charging jar and the inlet of the dispensing jar; a mixer for the gas and water let into said pipe connection; and means for timely operating the valves of said inlets and outlets.

7. In an apparatus for aerating liquids, the combination of a charging jar having a valve-controlled inlet communicating with the water source, a valve-controlled inlet communicating with the gas source, and a joint outlet passage for the water and gas; a dispensing jar having a valve-controlled inlet for the mixed water and gas, and a valve controlled delivery for the same; an injector nozzle in the charging jar communicating with the gas inlet and arranged to inject the gas into the outlet passage of said jar to carry the water with it from said jar; a pipe connection between the outlet passage of the charging jar and the inlet of the dispensing jar; a mixer for the gas and water let into said pipe connection said mixer consisting of the shell with its alternating centrally and annularly perforated disks; and means for timely operating the valves of said inlets and outlets.

8. In an apparatus for aerating liquids, the combination of a charging jar, and a dispensing jar arranged side by side, the charging jar having a water inlet, a gas inlet, a joint water and gas outlet and an air and gas relief vent, and the dispensing jar having an inlet for the mixed water and gas, a delivery for the same and a gas relief vent; an injector nozzle in the charging jar communicating with the gas inlet and arranged to inject the gas into the outlet passage of said jar to carry the water with it from said jar; a pipe connection between the outlet passage of the charging jar and the inlet of the dispensing jar; valves moving perpendicularly to and from their seats to control the several inlets, outlets and vents; and a cam shaft to timely operate said valves.

9. In an apparatus for aerating liquids substantially as herein described, the charging jar having the vent tube; the valve for controlling said tube, said valve having a stem; the cam shaft for operating said valve through its stem, and the float in the jar connected with said valve.

In testimony whereof I have signed my name to this specification in the presence of two subscribing witnesses.

JACKSON B. YOUNG.

Witnesses:
Wm. F. Booth,
D. B. Richards.